United States Patent
Francesca et al.

(10) Patent No.: US 7,353,004 B2
(45) Date of Patent: Apr. 1, 2008

(54) MULTI-CHANNEL BROADBAND CONTENT DISTRIBUTION SYSTEM

(75) Inventors: Anthony Francesca, Pleasanton, CA (US); WeiMin Zhang, San Jose, CA (US)

(73) Assignee: Broadlogic Network Technologies, Inc., San Jose, CA (US)

( * ) Notice: Subject to any disclaimer, the term of this patent is extended or adjusted under 35 U.S.C. 154(b) by 0 days.

(21) Appl. No.: 10/172,777

(22) Filed: Jun. 14, 2002

(65) Prior Publication Data
US 2003/0083054 A1    May 1, 2003

Related U.S. Application Data

(60) Provisional application No. 60/335,928, filed on Nov. 1, 2001.

(51) Int. Cl.
H04B 1/02 (2006.01)
H04B 1/66 (2006.01)

(52) U.S. Cl. ............ 455/102; 455/103; 455/91; 455/561; 455/3.01; 455/3.05; 370/535; 370/536; 370/537; 370/252; 370/345

(58) Field of Classification Search ............ 455/91, 455/102–103, 3.01–3.05, 418, 561; 370/535–540, 370/475, 486, 498, 431, 335–336, 330, 345, 370/343, 349, 329, 389, 236, 252
See application file for complete search history.

(56) References Cited

U.S. PATENT DOCUMENTS 4,789,984 A * 12/1988 Swartz ............ 370/541
5,471,463 A * 11/1995 Hulbert ............ 370/335
5,563,884 A * 10/1996 Fimoff et al. ............ 370/391
5,771,229 A   6/1998 Gavrilovich
6,094,444 A * 7/2000 Auer ............ 370/535

(Continued)

FOREIGN PATENT DOCUMENTS

JP    2001-505009    4/2001

(Continued)

*Primary Examiner*—Matthew D. Anderson
*Assistant Examiner*—Tuan Tran
(74) *Attorney, Agent, or Firm*—Townsend and Townsend and Crew LLP

(57) ABSTRACT

The system of a content head end of a distribution system includes a program multiplexer, a multi-channel modulating module, a channel multiplexer, a digital-to-analog converter and a frequency block-up converter, all arranged in a sequential configuration. Packets representing respective content programs are fed to the program multiplexer. The program multiplexer multiplexes the packets into an output queue. Packets from the output queue are then fed to the multi-channel modulating module. The multi-channel modulating module receives the packets and routes them to various modulators representing corresponding RF channels. The various modulators then modulate the respective packets to generate corresponding RF signals. These RF signals are then multiplexed by the channel multiplexer into a multi-channel RF signal. The multi-channel RF signal is then forwarded to the digital-to-analog converter for conversion into an analog, multi-channel RF signal. The frequency block-up converter then takes the analog multi-channel RF signal and shifts its to a higher frequency band for transmission to one or more customer premises equipment.

43 Claims, 12 Drawing Sheets

U.S. PATENT DOCUMENTS

| | | | |
|---|---|---|---|
| 6,219,358 B1 * | 4/2001 | Pinder et al. | 370/537 |
| 6,577,414 B1 * | 6/2003 | Feldman et al. | 725/129 |
| 2001/0001611 A1 * | 5/2001 | Yuzawa | 370/475 |
| 2002/0089995 A1 * | 7/2002 | Shalvi et al. | 370/431 |
| 2002/0154703 A1 | 10/2002 | Kubota et al. | |

FOREIGN PATENT DOCUMENTS

| | | |
|---|---|---|
| JP | 2001-156774 | 6/2001 |
| WO | WO 98/20630 | 5/1998 |
| WO | WO 01/56244 A1 | 8/2001 |

* cited by examiner

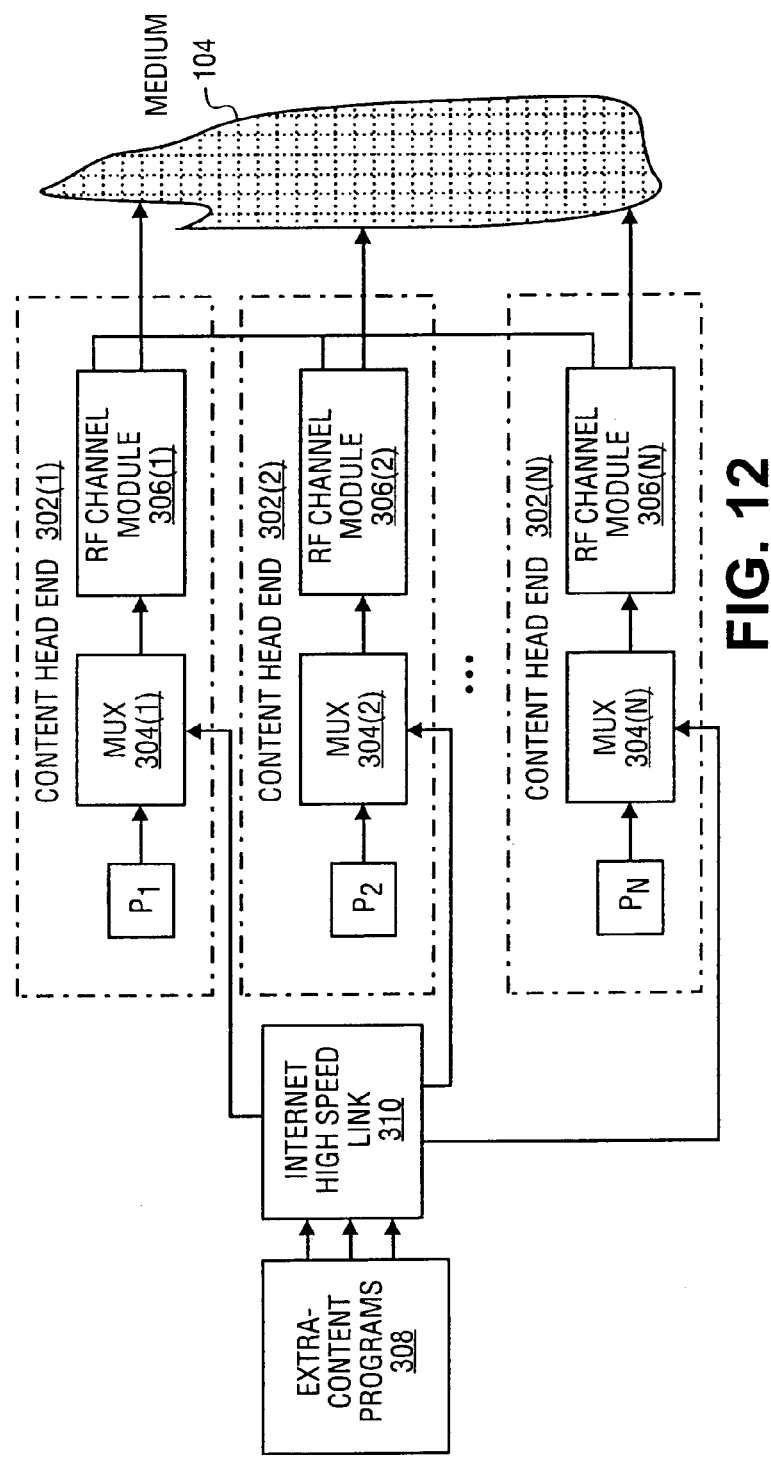

MULTI-CHANNEL BROADBAND CONTENT DISTRIBUTION SYSTEM

CROSS-REFERENCES TO RELATED APPLICATION

The present application claims the benefit of priority under 35 U.S.C. §119 from the provisional patent application, U.S. Provisional Patent Application Ser. No. 60/335,928, filed on Nov. 1, 2001, which is incorporated by reference as if set forth in full in this document.

BACKGROUND OF THE INVENTION

The present invention generally relates to broadband communications. More specifically, the present invention relates to a method and system for managing bandwidth in content distribution systems.

Traditional content distribution systems, such as, digital cable, satellite, and terrestrial broadcast systems, provide content programs (e.g., video, audio and data) over a large number of RF channels. Each RF channel may contain multiple content programs, with any given content program being delivered entirely through a single RF channel.

For a conventional cable system, downstream signals of such a system are traditionally divided into evenly spaced RF channels each having a specific frequency. This specific frequency is six (6) MHz in North America and six and seven/eighths (6 ⅞) MHz outside of North America. Each RF channel has its own content head end equipment to handle transmission of one or more content programs. FIG. 1 is a simplified high-level block diagram of a typical content head end 10. As shown in FIG. 1, each content program or source is fed into a sequential configuration including a modulator 12, a digital-to-analog converter 14 and a frequency converter 16. Furthermore, at the customer premises end, each 6-MHz RF channel requires its own analog tuner and demodulator in order to receive the content programs being transmitted. A customer or end user selects a content program via a remote control or other device. To select a particular content program, an analog tuner is set to output only the RF channel containing the content program of interest. A channel demodulator demodulates the signals received by the analog tuner. The demodulated signals representing the content program is then sent to an end user unit which may be a video display or recording device, such as a television, VCR, or data network devices, such as, computers.

One limitation associated with the foregoing system is that the system has a relatively narrow bandwidth. As mentioned above, each RF channel is limited to a frequency bandwidth of 6 MHz. If a content program that is sent to a particular RF channel has a large amount of information, it will take longer to send the entire content program because the RF channel carrying it has limited bandwidth. For example, the typical digital bandwidth for a conventional cable system is limited to about 30-40 Mbps. High quality digital video requires about five (5) GBytes (40 Gbits) of digital content. Downloading such a file can take more than fifteen (15) minutes.

To increase the bandwidth of each RF channel, the frequency of the RF channel may be extended to higher frequencies, such as, 12-MHz and 24-MHz. This increase in RF channel bandwidth, however, only has limited success due to incompatibility with legacy systems, such as, existing customer premises equipment. There are a large number of legacy systems that are still currently in use, most of which are unable to handle or accommodate an increase in RF channel bandwidth. For example, an analog tuner and demodulator in a digital set top box that is designed to handle a 6-MHz RF channel is unable to select and demodulate a 12-MHz or 24 MHz RF channel.

Another limitation associated with the foregoing system is that the system does not efficiently utilize the available bandwidth. In digital systems, content programs are divided into packets of information which are sent over RF channels, each of which has a limited amount of bandwidth. The amount of RF channel bandwidth required to send the packets of a particular content program depends on the amount of information in that content program. Furthermore, due to the physical separation of the RF channels, the system is unable to utilize the full available bandwidth. For example, assume an RF channel has a total bandwidth of 20 Mbps and one or more digital video programs each requiring a bandwidth of 3-4 Mbps. After accommodating multiple digital video programs, the RF channel typcially has 1-2 Mbps remaining in its total bandwidth. This remaining bandwidth, however, is usually unusable because it is not sufficient to support at least one single digital video program.

In addition, to function properly, traditional cable systems insert null packets into an RF channel if the collective number of packets for the content programs being transmitted does not fill the RF channel to capacity, or alternatively, the remaining capacity is not sufficient to transmit a content program. Such null packets can be filled with arbitrary bits, such as, pseudo random information. For example, if two (2) content programs of two (2) units each were carried by an RF channel having enough bandwidth to carry five (5) units of content programs, one (1) unit of null packets would be inserted into the RF channel for the system to operate properly. In this example, one (1) unit worth of bandwidth would in effect go unused.

Hence, it would be desirable to provide a method and system for use in connection with a content distribution system that is capable of efficiently utilizing the available bandwidth and is also compatible with existing customer premises equipment.

SUMMARY OF THE INVENTION

A method and system for managing bandwidth in a content distribution system is provided. At least some embodiments of the present invention are characterized by lower cost, lower power consumption, lower complexity, and/or superior performance. Preferred embodiments are compatible with existing customer premises equipment.

An exemplary embodiment of the present invention is a system that can be incorporated into the content head end of a content distribution system. According to one exemplary embodiment, the system includes a program multiplexer, a multi-channel modulating module, a channel multiplexer, a digital-to-analog converter and a frequency block-up converter, all arranged in a sequential configuration.

The program multiplexer is configured to receive a number of content programs. More specifically, packets representing respective content programs are fed to the program multiplexer. The program multiplexer multiplexes the packets into an output queue. How the packets are multiplexed by the program multiplexer into the output queue depends on the specific design and/or application. In one exemplary embodiment, the program multiplexer further includes a number of buffers, where each buffer receives and stores packets from a content program, and a data sampler that samples the buffers and outputs packets from one or more buffers onto the output queue.

Packets from the output queue are then fed to the multi-channel modulating module. The multi-channel modulating module receives the packets and routes them to various modulators representing corresponding RF channels. The various modulators then use the respective packets to modulate and generate corresponding RF signals. In one exemplary embodiment, the multi-channel modulating module further includes a channel sampler configured to sample and distribute packets from the output queue to the various modulators. How the channel sampler samples and distributes the packets to the various modulators depends on the specific design and/or application.

The RF signals from the multi-channel modulating module are then multiplexed by the channel multiplexer into a digital multi-channel RF signal. The digital multi-channel RF signal is then forwarded to the digital-to-analog converter for conversion into an analog, multi-channel RF signal.

The frequency block-up converter then takes the analog multi-channel RF signal and shifts it to a higher frequency band for transmission. The shifted analog multi-channel RF signal is then transmitted over a medium to one or more customer premises equipment.

Alternatively, the packets from the output queue are respectively fed to a number of single channel modulators. Each single channel modulator is coupled to a digital-to-analog converter. Each digital-to-analog converter, in turn, is coupled to a frequency block-up converter. Signals from the various frequency block-up converters are then fed to an RF channel multiplexer. The RF channel multiplexer then selectively multiplexes and transmits the signals from the frequency block-up converters over the medium to one or more customer premises equipment.

By combining multiple RF channels into one virtual wide-band channel, i.e., by spreading content programs across multiple RF channels for transmission, the effective bandwidth can be made to closely match the total available bandwidth. In other words, by using one virtual wide-band channel, both contiguous and non-contiguous signals from multiple RF channels are effectively combined together and act like one single wide channel. This increase in bandwidth utilization allows a wider range of programming to be implemented. For example, with regard to some implementations, such as, video broadcasting, different types of movie features having different bandwidth requirements can be more efficiently delivered. This provides at least one advantage over the use of traditional wide-band channel where a band of contiguous signals from multiple RF channels are grouped together to provide one single wide channel. Reference to the remaining portions of the specification, including the drawings and claims, will realize other features and advantages of the present invention. Further features and advantages of the present invention, as well as the structure and operation of various embodiments of the present invention, are described in detail below with respect to accompanying drawings, like reference numbers indicate identical or functionally similar elements.

BRIEF DESCRIPTION OF THE DRAWINGS

FIG. 12 is a simplified high-level block diagram of an exemplary embodiment of a content head end according to the present invention.

DETAILED DESCRIPTION OF THE INVENTION

Figure 1:
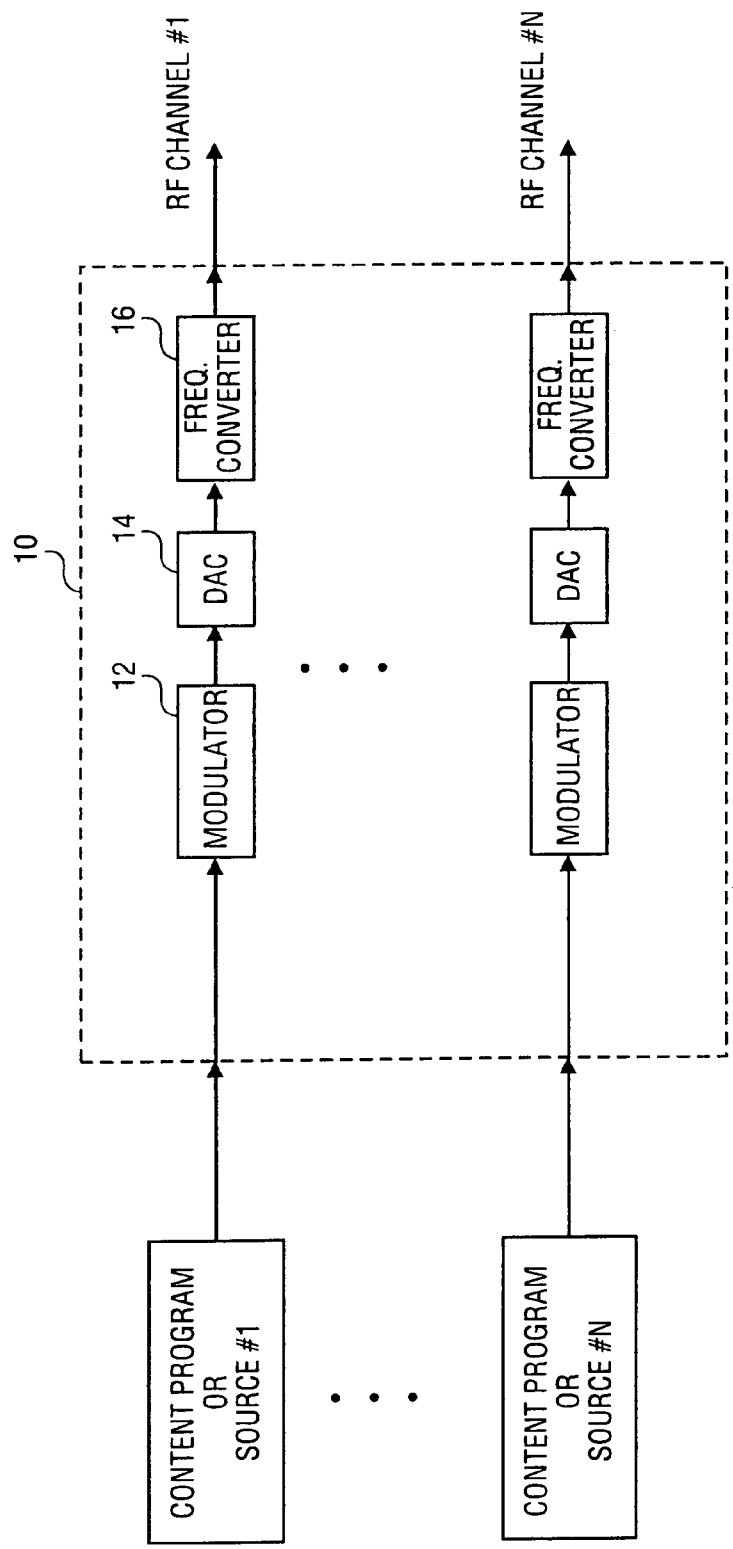
FIG. 1 is a simplified high-level block diagram illustrating a typical content head end.

The present invention in the form of one or more exemplary embodiments will now be described. For purposes herein, a "multi-channel RF signal" is an RF signal in a given frequency band that carries multiple RF channels. The location of the RF signal frequency band within the frequency spectrum can vary from very low frequencies to tremendously high frequencies. Each RF channel is characterized by an RF channel bandwidth that occupies a particular portion of the RF signal frequency band. Each RF channel is further characterized by a carrier signal that falls within the RF channel bandwidth. An RF channel can be analog or digital depending on the specific application.

Each RF channel can carry one or more content programs. Each content program, in whole or in part, is superimposed on the carrier frequency of an RF channel being used to transmit that content program. Content programs, also referred to as content channels, content streams, or program feeds, contain information that can be accessed or used by subscribers. For example, a content program can be designated as channel 6 on a television and modulated to carry the Discovery Channel®. Moreover, a single content program can also be modulated to carry one or more specialized categories of information, such as, audio, video, digital data, conditional access data, etc. For example, two content programs, one carrying audio information and the other carrying video information, can be fed into a television to provide the Discovery Channel®. Content programs can be pre-programmed or selected by a program provider. The term "digital content" or "data stream" can be used to describe a content program that is in digital form. Whether a content program is analog or digital will depend on the specific application.

According to an exemplary embodiment of the present invention, multiple RF channels are managed collectively as a virtual wideband channel. The respective frequencies or bandwidths of the multiple RF channels may or may not be different depending on the specific design or application. Furthermore, the multiple RF channels may be either contiguous or non-contiguous. By managing the RF channels as a virtual wideband channel, the total available bandwidth from all the RF channels is more efficiently utilized. More specifically, a content program does not need to be transmitted over one single, dedicated RF channel. Instead, a content program may be divided up into appropriate portions. These portions are then transmitted over multiple RF channels to allow more efficient use of the total available bandwidth.

For instance, at any given time, one RF channel can carry one or more content programs. Alternatively, at any given time, two or more RF channels in combination can carry a single content program; in other words, one content program can be divided into separate portions and carried over two or more RF channels. The two or more RF channels that collectively carry the content program can but need not be contiguous. Furthermore, portions of the content program can be carried over two or more RF channels at the same time or at different times. In digital implementations, such portions may be referred to as "packets".

Figure 2:
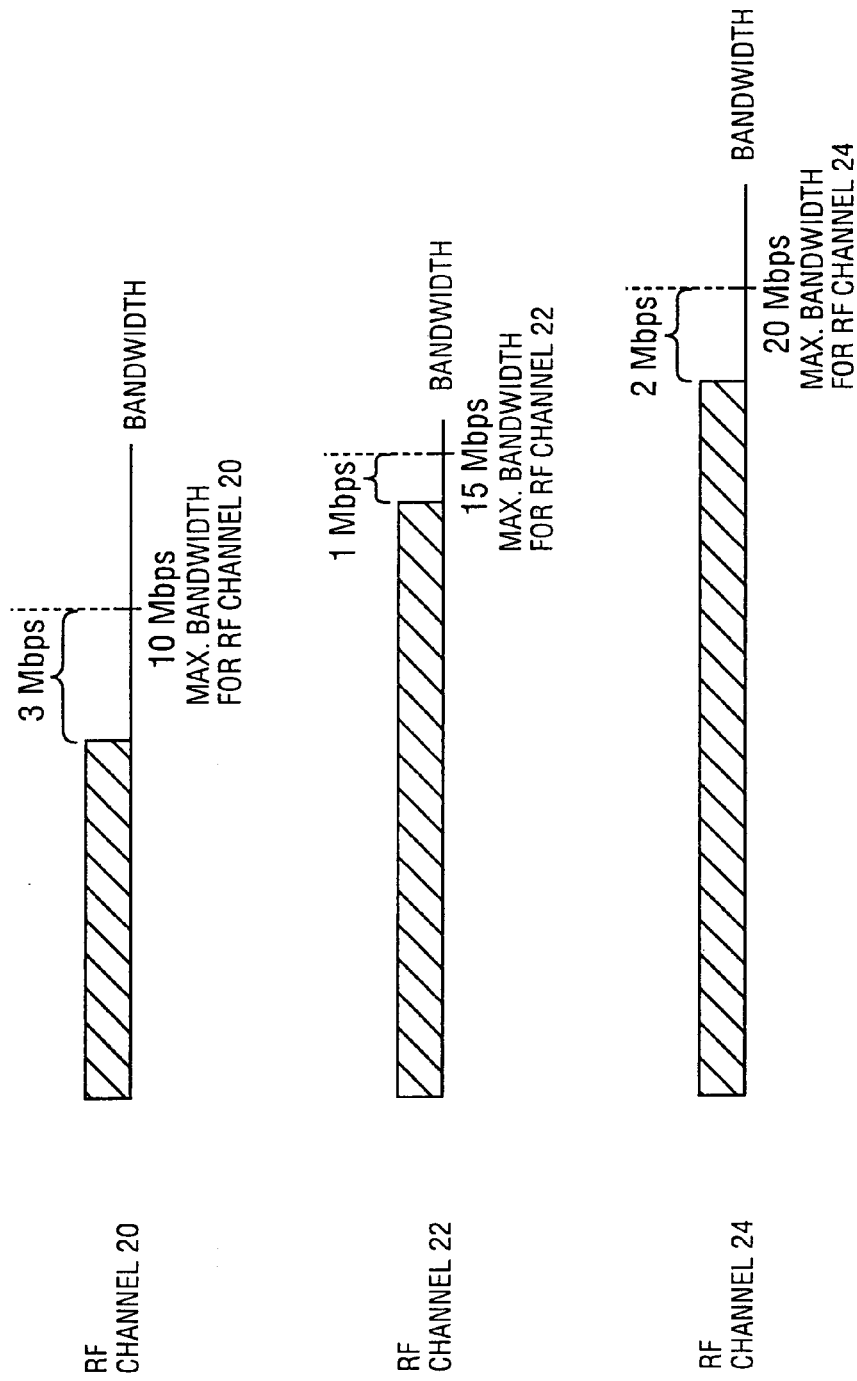
FIG. 2 is a simplified diagram illustrating an exemplary aspect of the present invention.

FIG. 2 is a simplified diagram illustrating an exemplary aspect of the present invention. As shown in FIG. 2, there are three (3) RF channels 20, 22 and 24. These RF channels 20, 22 and 24 have different bandwidths, namely, 10 Mbps, 15 Mbps and 20 Mbps respectively. The bandwidth of RF channel 20 has an unused capacity of 3 Mbps. Likewise, the bandwidths of RF channels 22 and 24 have respective unused capacity of 1 Mbps and 2 Mbps. A content program that is to be transmitted is split up into appropriate portions. Using the respective unused capacity of the three RF channels 20, 22 and 24, these portions are then accordingly routed to the three RF channels 20, 22 and 24 for transmission. As a result, the total available bandwidth of the three RF channels 20, 22 and 24 is more efficiently utilized. The foregoing illustration only shows one content program being collectively transmitted over the three RF channels 20, 22 and 24. However, it should be understood that two or more content programs may be divided up and routed over multiple RF channels. For example, a RF channel may have sufficient unused capacity or bandwidth to accommodate respective portions of two content programs. Based on the disclosure provided herein, it will be clear to a person of ordinary skill in the art how a content program is to be divided up and distributed over multiple RF channels in order to maximize utilization of total available bandwidth.

Optionally, one or more of the multiple RF channels may be dedicated for transmitting a specific content program. This may be desirable in situations in which faster transmission of a specific content program is important. By transmitting a specific content program over a dedicated RF channel, there is generally less processing required to reconstitute the content program by the customer premises equipment.

In addition, optionally, one or more of the multiple RF channels may be dedicated for transmitting content programs to specific customer premises equipment. This may be desirable where the customer premises equipment is only equipped to handle signals received from an RF channel having a particular frequency. For example, certain existing or legacy customer premises equipment may only be capable of handling signals from an 6-MHz RF channel.

Figure 3:
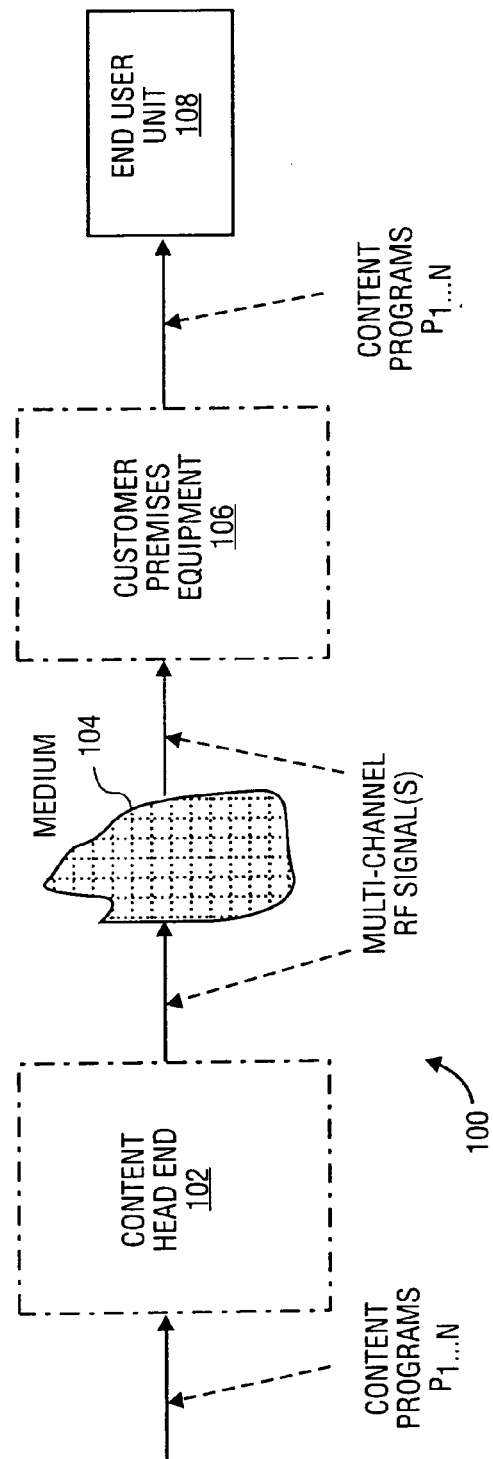
FIG. 3 is a simplified high-level block diagram of a conventional cable system that can be used in connection with the present invention.

FIG. 3 is a simplified high-level block diagram of a conventional cable system 100 that can be used in connection with the present invention. Based on the disclosure provided herein, it will be clear to a person of ordinary skill in the art how the present invention can be implemented and practiced in connection with the conventional cable system 100. It should be understood that the present invention may also be used with other types of content distribution systems, such as, terrestrial wireless, and digital satellite systems.

As shown in FIG. 3, the cable system 100 processes a number of content programs $P_{1 \ldots N}$. The cable system 100 includes a content head end (CHE) 102 which receives and processes the content programs $P_{1 \ldots N}$. The processed content programs $P_{1 \ldots N}$ are then sent as one or more multi-channel RF signals over a medium 104 to one or more subscribers who are provided with customer premises equipment (CPE) 106. CPE 106 receives one or more multi-channel RF signals and processes them to extract the content programs $P_{1 \ldots N}$ that are then sent to one or more end user units 108. End user unit 108, sometimes referred to as a presentation unit, can be one of a number of devices, such as, computers, storage devices, display devices, televisions, and video recording devices, such as, VCRs and PVRs.

Figure 4:
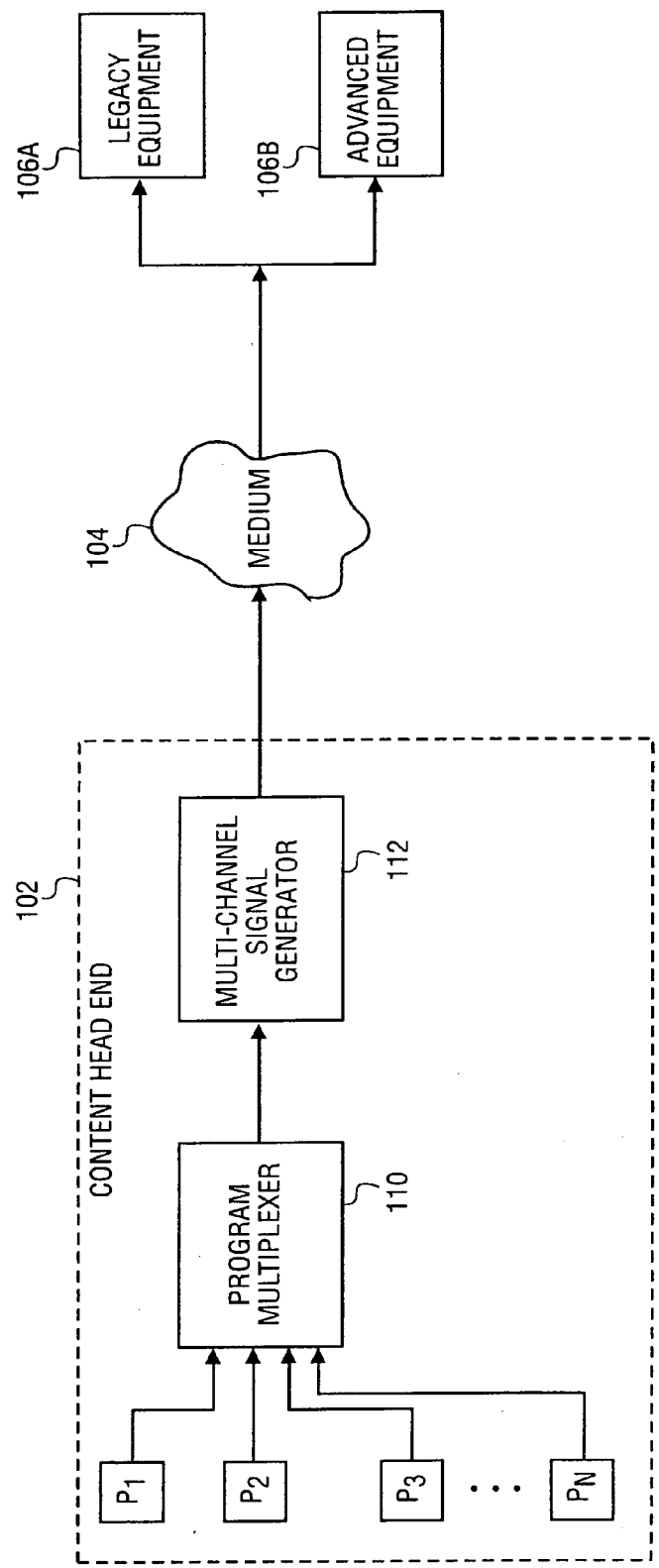
FIG. 4 is a simplified high-level block diagram of one exemplary embodiment of a content head end according to the present invention.

FIG. 4 is a simplified high-level block diagram of an exemplary embodiment of the CHE 102 according to the present invention. Referring to FIG. 4, the CHE 102 is made up of a number of components including a program multiplexer 110 and a multi-channel signal generator 112. The multi-channel signal generator 112 is sometimes implemented as physical layer hardware. In one exemplary embodiment, the various components of the CHE 102 may be implemented on an integrated chip. The CHE 102 operates in the following exemplary manner. The content programs $P_{1 \ldots N}$ are fed into the program multiplexer 110. In digital implementations, each content program is received by the program multiplexer 110 in the form of packets. The program multiplexer 110 multiplexes the respective packets of the content programs $P_{1 \ldots N}$ into an output queue. Packets from the output queue are then fed to the multi-channel signal generator 112. The multi-channel signal generator 112 then uses the packets to form an analog multi-channel RF signal. The analog multi-channel RF signal is formed by multiplexing the packets onto various RF channels. These RF channels may or may not be contiguous; that is, these RF channels may be non-contiguous. The analog multi-channel RE signal is then transmitted over the medium 104 and distributed to the customer premises equipment 106 including, for example, legacy equipment 106a that is capable of receiving only a single RF channel at a time and advanced equipment 106b that is capable of receiving multiple RF channels concurrently.

Figure 5:
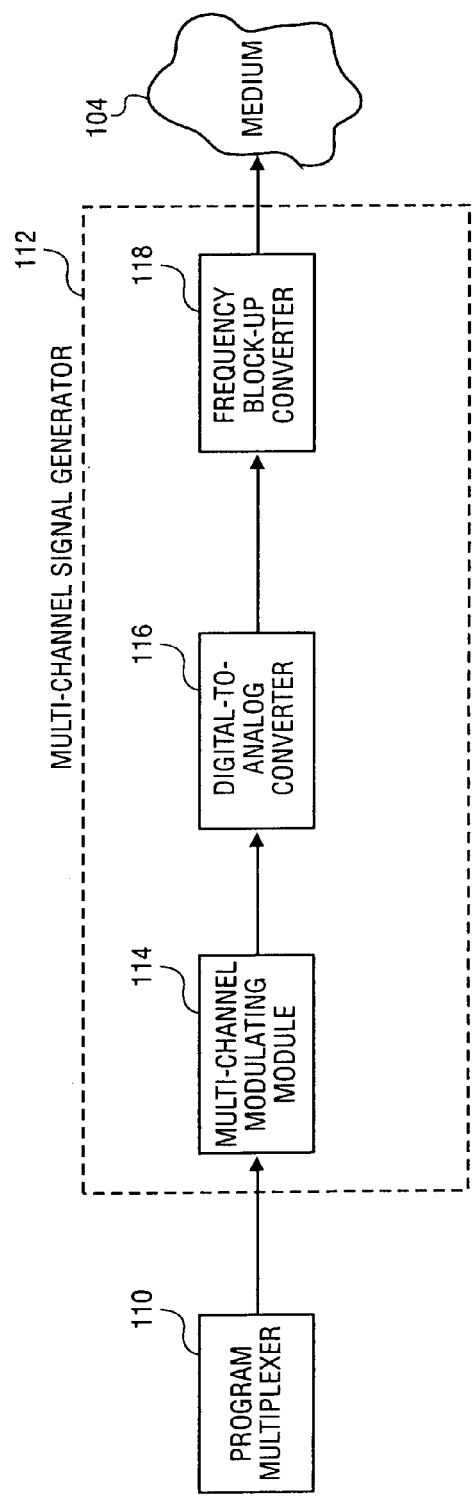
FIG. 5 is a simplified high-level schematic diagram of one exemplary embodiment of a multi-channel signal generator according to the present invention.

FIG. 5 is a simplified high-level block diagram of an exemplary embodiment of the multi-channel signal generator 112 according to the present invention. Referring to FIG. 5, the multi-channel signal generator 112 is made up of a number of components including a multi-channel modulating module 114, a digital-to-analog converter 116 and a block-up converter 118. As shown in FIG. 5, these components are arranged in a sequential configuration. In an exemplary embodiment, the various components of the multi-channel signal generator 112 can be integrated on a single chip. The multi-channel signal generator 112 operates in the following exemplary manner. As previously described above, the content programs $P_{1 \ldots N}$ are fed into the program multiplexer 110. In digital implementations, each content program is received by the program multiplexer 110 in the form of packets. The program multiplexer 110 multiplexes the respective packets of the content programs $P_1 \ldots _N$ into the output queue. The combination of the multi-channel modulating module 114, the digital-to-analog converter 116 and the block-up converter 118 then distributes the packets from the output queue into various RF channels for transmission over the medium 104, as will be further described below. The RF channels may or may not be non-contiguous. Each RF channel can carry packets from one or more content programs to be accessed or used by a subscriber. More specifically, each content program, in whole or in part, is superimposed on the carrier frequency of one or more RF channels. For example, some content programs are dedicated for transmission over specific RF channels to accommodate existing or traditional standards of certain receiving devices; and other content programs are transmitted across multiple RF channels subject to the total bandwidth availability. As such, the CHE 102 can combine any and all unused bandwidth to transmit additional content programs, for example, additional services or programs. This significantly increases the data rate. Additional details regarding the CHE 102 are provided below.

Figure 6:
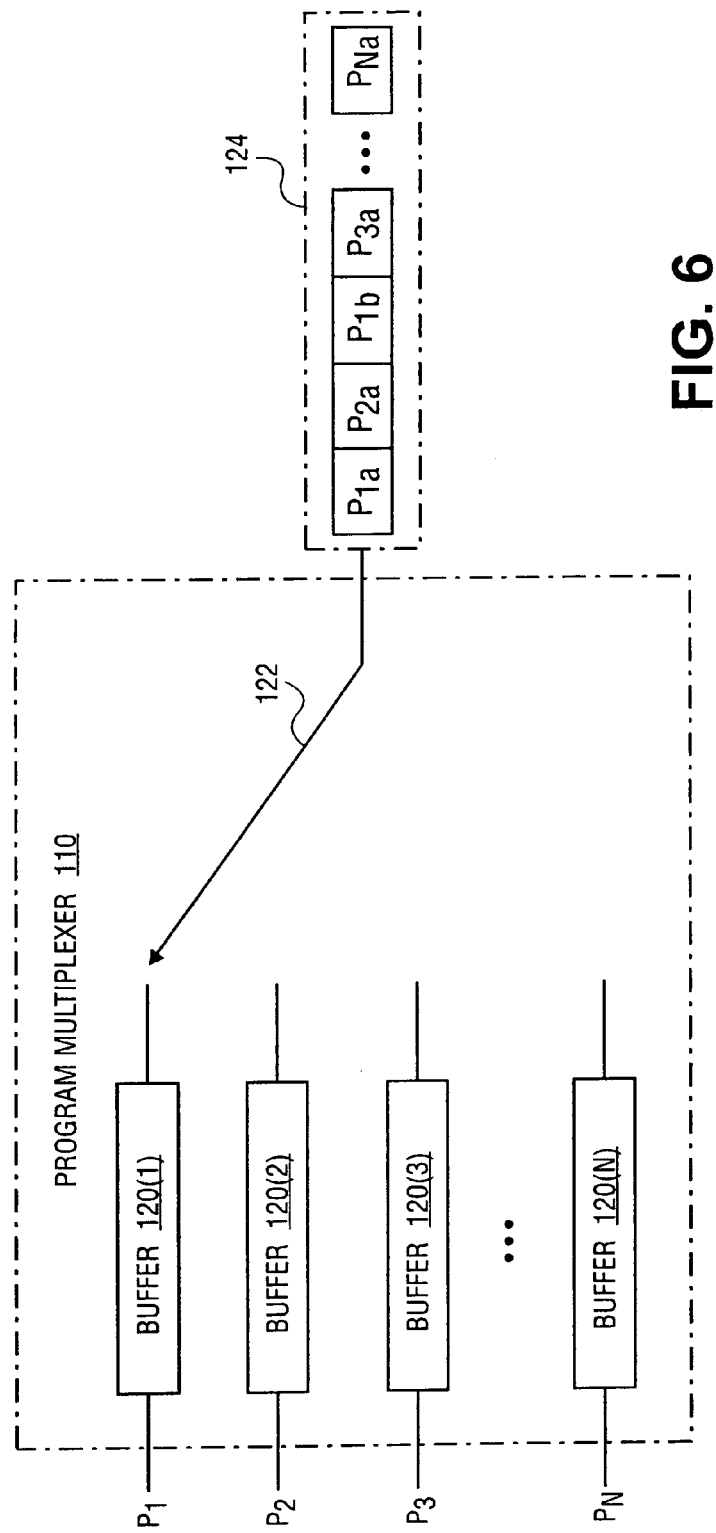
FIG. 6 is a simplified high-level schematic diagram of one exemplary embodiment of a program multiplexer according to the present invention.

FIG. 6 is a simplified high-level schematic diagram of one exemplary embodiment of the program multiplexer 110 according to the present invention. The program multiplexer 110 includes a number of buffers 120(1 . . . N). Each buffer is configured to receive and store portions of a content program as the portions arrive. In digital implementations, the portions of a content program are represented by packets. For example, content program $P_1$ may be represented by packets $P_{1a}, P_{1b}, \ldots, P_{1m}$. As each packet arrives at the program multiplexer 110, the packet is routed to a corresponding buffer 120. For example, as shown in FIG. 6, packets for the content programs $P_1 \ldots _N$ are respectively received by the corresponding buffers 120(1 . . . N). Whether packets representing an entire content program can be stored in one buffer depends on the specific design and/or application. Also, the exact number of buffers that are to be included in the program multiplexer 110 depends on the specific design and/or application.

The program multiplexer 110 further includes a data sampler 122. The data sampler 122 periodically samples the buffers 120(1 . . . N) to retrieve and output packets onto an output queue 124. Based on the disclosure provided herein, a person of ordinary skill in the art should be able to use commonly known circuit technology to implement the program multiplexer 110.

Because the respective availabilities of packets from the content programs vary, the data rates of the different content programs also vary. However, the data sampler 122 continually samples buffers 120(1 . . . N) so that the output queue 124 is kept at maximum capacity. That is, packets are appropriately routed to the output queue 124 as needed if unused bandwidth becomes available on the output queue 124. As a result, no null packets of information need to be inserted into the output queue 124. As will be further described below, by maintaining the output queue 124 at its maximum capacity, the effective bandwidth of the RF channels is made to match the total available bandwidth of the RF channels. Furthermore, the data rate for each RF channel is kept relatively constant thereby allowing the RF channel to be more fully utilized.

Other embodiments of the program multiplexer 110 are possible depending on the specific design and/or application. For example, another embodiment of the program multiplexer 110 could include in place of or, in addition to buffers, an array of memory that stores content program packets as they arrive. Similarly, the arrangement of the array and the order in which the packets are selected may vary depending on the specific design and/or application. In another embodiment, the program multiplexer 110 may have two or more output queues. Packets may be delivered to these output queues based on a predetermined order that is specific to a particular design and/or application. For example, packets belonging to a particular content program may be routed to a specific output queue for delivery.

The contents from the output queue 124 of the program multiplexer 110 are fed to the multi-channel modulating module 112. As described above, the output queue 124 of the program multiplexer 110 includes respective packets from various content programs $P_1 \ldots _N$.

Figure 7:
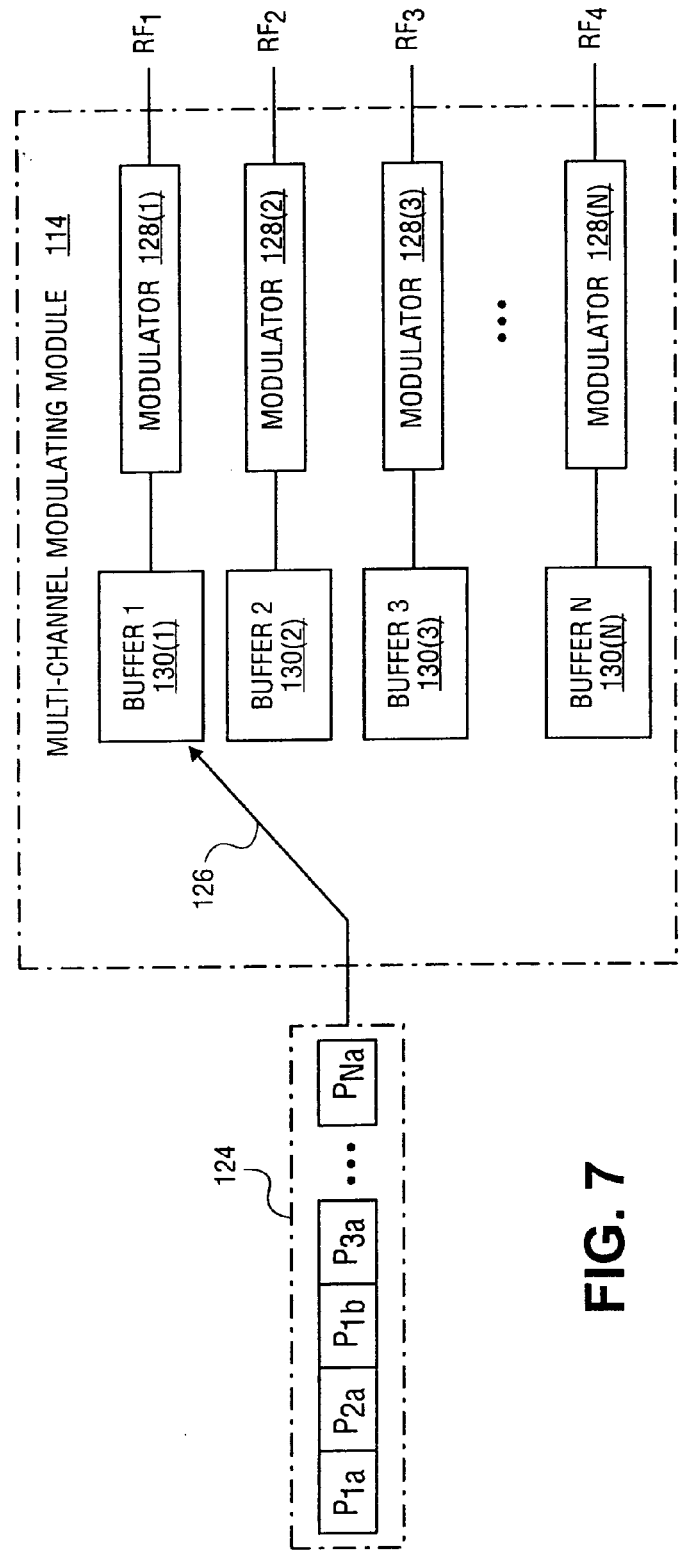
FIG. 7 is a simplified high-level schematic diagram of one exemplary embodiment of a multi-channel modulator according to the present invention.

FIG. 7 is a simplified high-level schematic diagram of an exemplary embodiment of the multi-channel modulating module 114. The multi-channel modulating module 114 includes a channel sampler 126 that samples packets from the output queue 124 and feeds them into one or more modulators 128(1 . . . N) that respectively correspond to the RF channels. The packets are typically stored in respective buffers 130(1 . . . N) before processing by the modulators 128(1 . . . N). Modulators 128(1 . . . N) then use the respective packets from the various content programs $P_1 \ldots _N$ to modulate and generate corresponding RF signals and output such RF signals onto corresponding RF channels. The exact number of modulators depends on the specific design and/or application. As noted above, the program multiplexer 110 may include two or more output queues. A person of ordinary skill in the art will know how to implement the channel sampler 126 to sample contents from multiple output queues.

In some exemplary embodiments, packets from the output queue 124 are distributed sequentially to different modulators 128(1 . . . N), one packet each per cycle; in other embodiments, packets may be distributed to different modulators 128 (1 . . . N) based on a predetermined order that is specific to a particular design and/or application. For example, a particular modulator may be selected to receive packets from a specific content program exclusively. This is useful when the customer premises equipment is only able to accommodate an RF channel with a particular frequency thereby requiring a content program to be delivered exclusively via that RF channel. In other embodiments where the customer premises equipment is able to accommodate multiple RF channels, packets of a content program may then be delivered to multiple modulators that correspond to the multiple RF channels.

The architecture of the multi-channel modulating module 114 enables it to handle multi-channel satellite, terrestrial TV (NTSC, ATSC, DVB-T, etc.), and cable signals. In certain embodiments, modulators 128(1 . . . N) are shared modulators in that they share resources. Functional blocks that can be shared between different modulators can include, for example, numeric controlled oscillators (NCOs), timing error detection circuitry, carrier recover circuitry, etc. Such resource sharing between such modulators can lead to significant power saving and thus allow a greater number of content programs to be modulated in a single chip.

Signals from the various RF channels of the multi-channel modulating module 114 are then fed to a channel multiplexer (not shown). The channel multiplexer may be implemented either as a part of the multi-channel modulating module 112 or as an individual component separate from the multi-channel modulating module 112. The channel multiplexer receives signals from the respective RF channels of the multi-channel modulating module 114 and multiplexes these signals into a single multi-channel RF signal. In an exemplary embodiment, the channel multiplexer is a digital multiplexer.

Output from the channel multiplexer is then fed to the digital-to-analog converter 116. The digital-to-analog converter 116 receives and converts the multiplexed, multi-channel RF signal from the channel multiplexer to an analog multi-channel RF signal. In an exemplary embodiment, the digital-to-analog converter 116 is a high-speed converter so that an entire signal band with multiple RF channels can be converted.

The output of the digital-to-analog converter 116 is then forwarded to the frequency block-up converter 118. The function of the frequency block-up converter 118 is to shift the analog multi-channel RF signal to a higher frequency band. In an exemplary embodiment, the frequencies are simply upshifted, i.e., the frequency band of each RF channel and the guard bands remain the same relative to each other, but all are translated up by the same frequency. More specifically, the analog multi-channel RF signal is multiplied by a reference signal to a higher frequency band. Signal components outside the higher frequency band are then filtered out. The frequencies are raised for transmission. For example, in some exemplary embodiments, the frequencies are shifted to a band above 500 MHz. The frequency up to which a given frequency band is shifted depends on the specific design and/or application. For cable systems, a single digital-to-analog converter is typically used. For satellite systems, while a single digital-to-analog converter can be used, at least two digital-to-analog converters are typically used due to compliance with more rigid requirements, e.g., synchronization is more difficult due to the higher frequencies. The shifted RF signal is then delivered to one or more CPEs (as shown in FIG. 3) via the medium 104.

Figure 8:
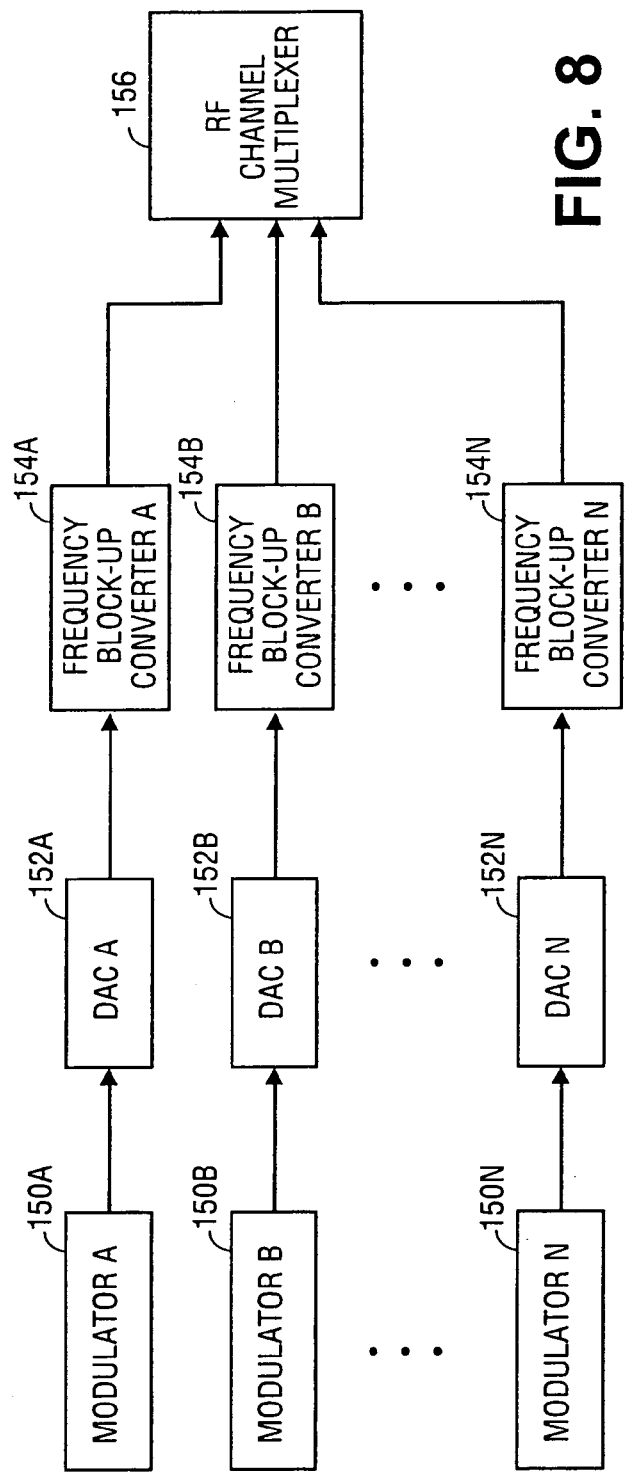
FIG. 8 is a simplified high-level schematic diagram of another exemplary embodiment of the multi-channel signal generator 112 according to the present invention.

Alternatively, the multi-channel signal generator 112 can be implemented in another exemplary manner. FIG. 8 is a simplified high-level schematic diagram of another exemplary embodiment of the multi-channel signal generator 112 according to the present invention. Referring to FIG. 8, the multi-channel signal generator 112 includes a number of single channel modulators 150, a number of digital-to-analog converters 152, a number of block-up converters 154 and an RF channel multiplexer 156. Each RF channel is associated with, for example, a single channel modulator 150a coupled to a digital-to-analog converter 152a that, in turn, is coupled to a block-up converter 154a. Packets from the program multiplexer 110 are respectively fed to the single channel modulators 150. Which packets are fed to which single channel modulators 150 is controlled by the program multiplexer 110 based on one or more schemes. For example, one scheme may be based on available bandwidth associated with an RF channel; another scheme may be based on a predetermined decision to route certain packets via a particular RF channel. Based on the disclosure provided herein, a person of ordinary skill in the art will know of other schemes to distribute the packets. The single channel modulator 150 uses the packets to produce a digital single channel RF signal. The digital single channel RF signal is then converted into an analog single channel RF signal by the digital-to-analog converter 152. The analog single channel RF signal is then shifted up by the frequency block-up converter 154. The shifted analog single channel RF signals from various block-up converters 154 are then combined or multiplexed by the RF channel multiplexer 156 to form an analog multi-channel RF signal which is then transmitted over the medium.

The CHE 102 as described in FIG. 4 is able to generate signals that can be used by CPEs that include both equipment that is able to handle multi-channel RF signals and legacy equipment that is only able to handle RF signals with a specific frequency. FIG. 7 is a simplified high-level schematic diagram of a possible embodiment of the CPE 106 that can be used with the present invention. In this possible embodiment, CPE 106 includes a multi-channel demodulator 132 which is able to demodulate multiple RF channels simultaneously. In some embodiments, only selected RF channels are demodulated, which can reduce the data-download time. For example, a 5-GByte DVD movie can be downloaded within one (1) minute.

Some exemplary embodiments of the multi-channel demodulator 132 are described in co-owned and co-pending U.S. patent application Ser. No. 09/956,479, entitled "A Digital Implementation of Multi-Channel Demodulators,", Attorney Docket No.: 019927-001800US, filed Sep. 18, 2001, the disclosure of which is hereby incorporated by reference for all purposes.

Figure 9:
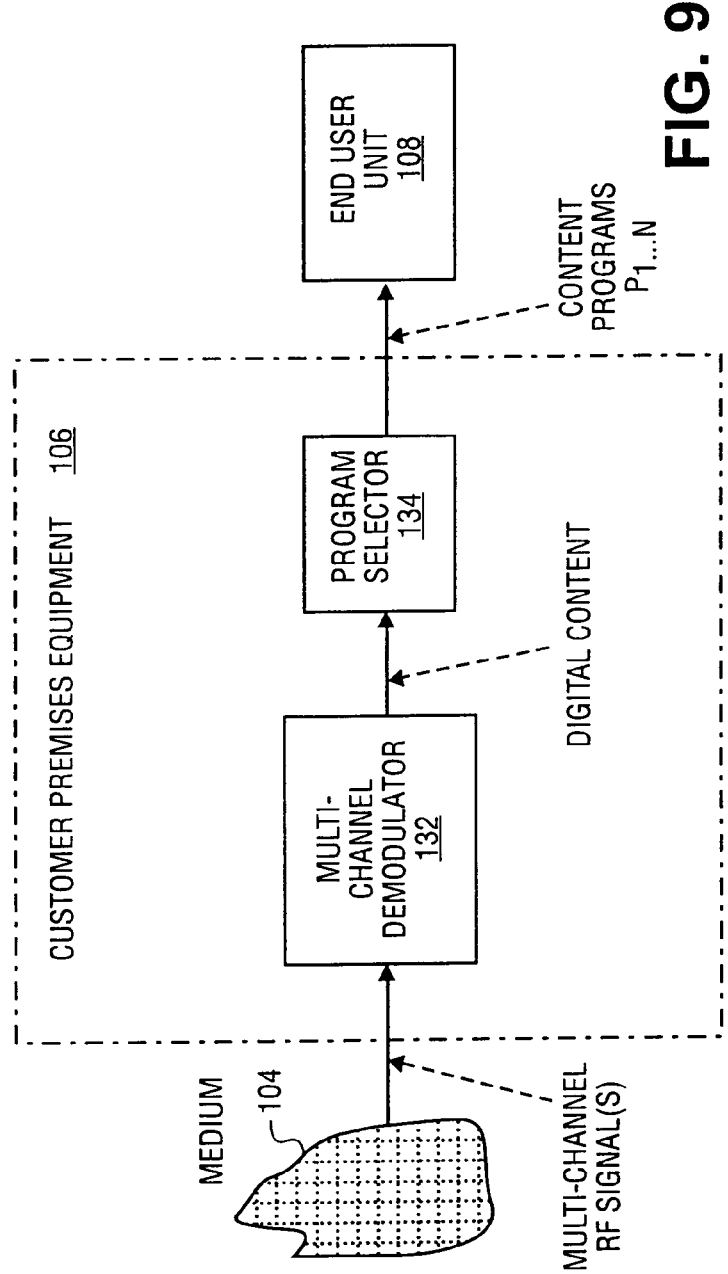
FIG. 9 is a simplified high-level block diagram of one possible embodiment of a customer premises equipment that can be used in connection with the present invention.

As shown in FIG. 9, the CPE 106 includes a digital program selector 134 that can be used to choose one or more content programs $P_{1 \ldots N}$ from the demodulated multiple RF channels. The one or more selected content programs are then sent to one or more end user units 108. The digital program selector 134 broadens the program selection range for the end user.

Figure 10:
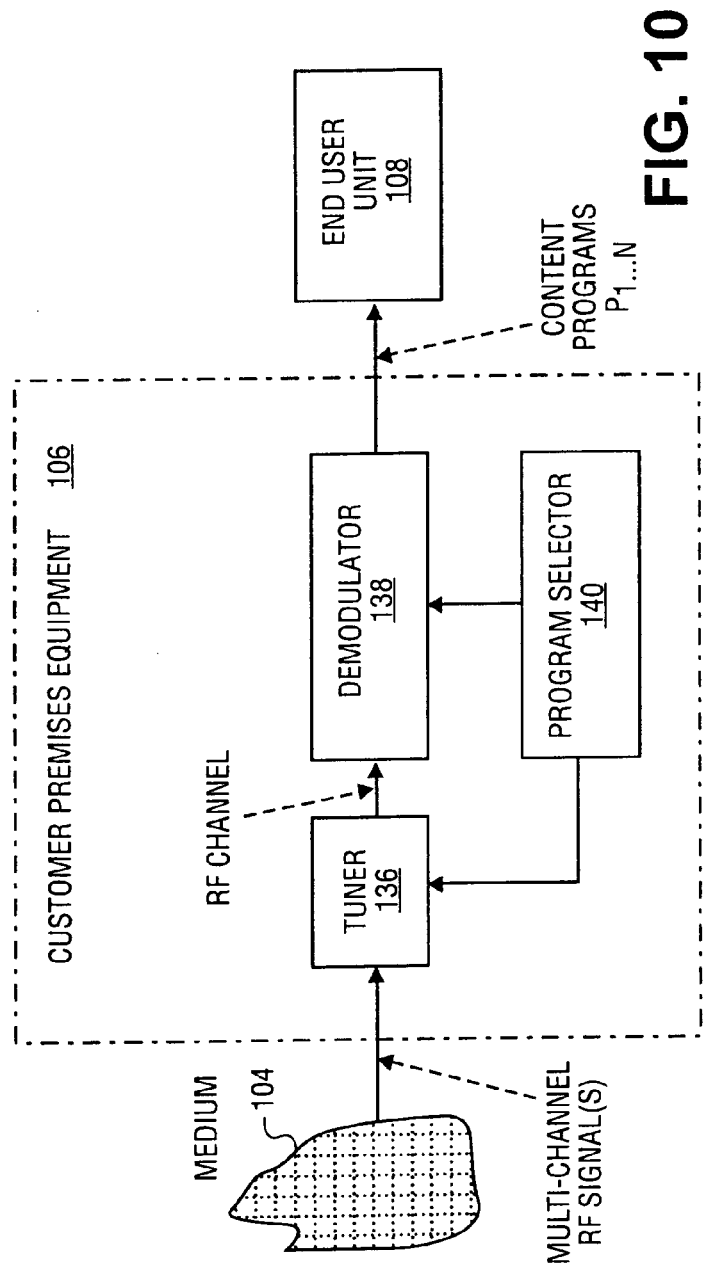
FIG. 10 is a simplified high-level block diagram of another possible embodiment of a customer premises equipment that can be used in connection with the present invention.

FIG. 10 is a simplified high-level block diagram of another possible embodiment of the CPE 106 that can be used with the present invention. This embodiment is typically found in legacy equipment. This embodiment includes a tuner 136 that receives one or more multi-channel RF signals from the medium 104 and passes signals from a specific RF channel to a demodulator 138. The demodulator 138 then demodulates signals from that specific RF channel to retrieve the desired content program. The tuner 145 can be programmable to switch from one RF channel to another. The CPE 106 further includes a program selector 140 that can be used to control the tuner 136 and the demodulator 138 to allow signals from a particular RF channel to be selected for demodulation. The demodulated signals representing the desired content program is then sent to the end user unit 108. It should be clear to those of ordinary skill in the art that a variety of tuners, demodulators, and program selectors that are well known can be used to implement the CPE as shown in FIG. 9. Other implementations of the CPE 106 as shown in FIG. 9 are possible depending on the specific design and/or application. For example, multiple tuners can be stacked to receive multiple RF channels. Demodulators and program selectors corresponding to each tuner can be used. Such demodulators and program selectors can also share resources.

Figure 11:
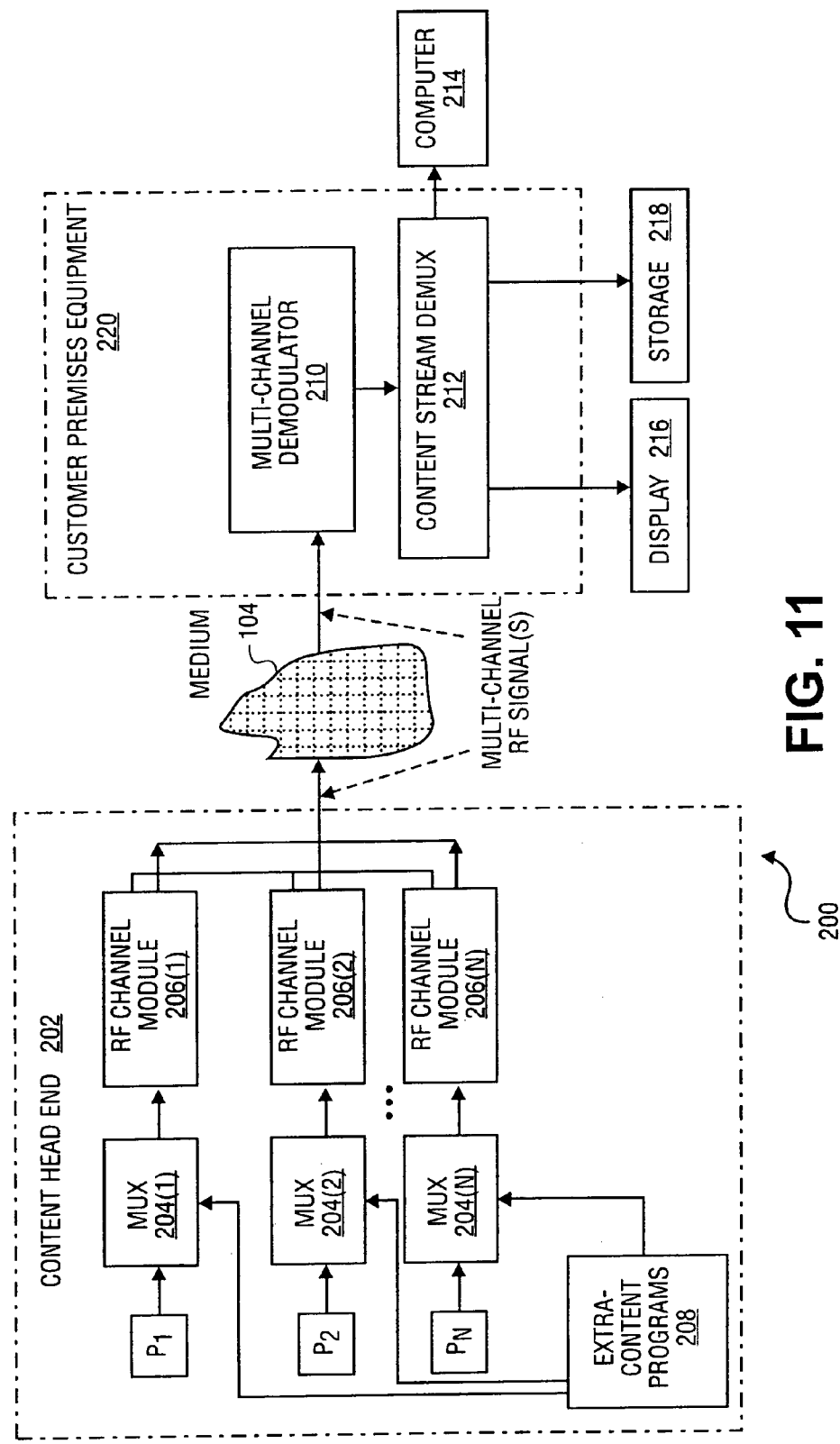
FIG. 11 is a simplified high-level block diagram of one exemplary embodiment of a content distribution system according to the present invention.

FIG. 11 is a simplified high-level block diagram of an exemplary embodiment of a content distribution system 200 according to the present invention. In this exemplary embodiment, the content distribution system 200 is a centralized head end distribution system, such as a cable or satellite system, where the CHE 202 and its associated RF channels are located in the same physical facility. Such a centralized solution is suitable for lower costs. The CHE 202 includes a number of program multiplexers 204(1 . . . N). Each of the program multiplexers 204(1 . . . N) is configured to receive and multiplex one content program $P_{1 \ldots N}$ from a particular source and one or more additional content programs 208, in whole or in part, from other sources. In digital implementations, a content program is made up of packets. The program multiplexer 204 collects the packets from a content program and forwards them to a RF channel module 206. Whether packets from an additional content program are to be included or multiplexed by the program multiplexer 204 depends on the available bandwidth of the program multiplexer 204. For example, if packets from a particular content program are arriving at a relatively slow rate and the program multiplexer 204 is able to handle more data, packets from the additional content program may then also be collected by the program multiplexer 204.

Each program multiplexer 202 is associated with an RF channel module 206. Each RF channel module 206 includes a combination of a modulator, a digital-to-analog converter and a frequency block-up converter (not shown). The function of the RF channel module 206 is to modulate the packets received from the program multiplexer 204 and put them into the appropriate format for transmission as RF signals over the associated RF channel in the medium 104. A person of ordinary skill in the art will know how to implement the RF channel module 206 using commonly known technologies. The RF signals are then received by the CPE 220.

As shown in FIG. 11, the CPE 220 includes a multi-channel demodulator 210 which receives RF signals from one or more RF channels and selectively demodulates the RF signals from one or more of those RF channels to retrieve the corresponding content programs. The multi-channel demodulator 210 operates in a similar manner as that discussed in connection with FIG. 9 above. The CPE 220 further includes a content stream demultiplexer 212 that receives and demultiplexes the corresponding content programs retrieved from the demodulated RF signals from one or more of the RF channels. The content programs are then send to one or more end user units including, for example, a computer 214, a display 216, and a storage unit 218.

FIG. 12 is a simplified high-level block diagram of another exemplary embodiment of a CHE according to another embodiment of the present invention. According to this embodiment, the CHE 302 is a non-centralized head end distribution system. Such a system is useful for systems having CHE equipment in different physical locations. Such systems are used, for example, by TV stations, radio stations, and so on. With TV stations, for example, each TV station has its own tower separated from others, making it difficult to combine different CHE equipment. By connecting the program multiplexers 304 to the Internet with a high speed link 310, spare or unused bandwidth from multiple RF channels an be combined collectively into a broadband channel for data and video distribution. For example, additional content programs can be delivered via the high speed link 310 to different CHEs depending on the available bandwidth from that CHE. As such, different programs and/or services can come from different sources.

Deployment of the present invention can improve performance of a digital cable system, satellite broadcasting system, and terrestrial digital broadcasting system. Because more effective bandwidth is available, additional services or content can be delivered. Also, an end user can gain access to more than one content program.

Furthermore, the present invention can be used in a variety of systems to provide cost-effective, reliable, and power-efficient solutions for home entertainment and information, such as delivering complex VLSI for high-performance video, audio and data content. Also, the present invention leverage the existing operator infrastructure while enabling new home networking architectures, new classes of consumer electronics devices, and new services. In addition, the present invention can also be used with system solutions using standard-process CMOS. Moreover, the present invention can be implemented without interrupting traditional single channel users and provides a potential upgrade for future services.

In conclusion, it can be seen that the present invention provides numerous advantages. For example, the present invention is compatible with existing digital cable, terrestrial wireless and satellite head end infrastructures. Also, the present invention can be adopted for video-on-demand services, data/video broadcasting services, and data communications.

The present invention can also eliminate the need for multiple downstream tuner/demodulator chipsets and multiple transport engines resulting in significantly reduced cost and power with the potential of delivering more than 10×performance and capacity. For satellite services, systems employing the present invention are able to receive an entire 500-MHz band without analog tuners and to support a DVB-RCS return channel. For cable services, a wide-band receiver utilizing the present invention can incorporate a DOCSIS return channel. Moreover, the present invention can be utilized in both satellite and cable systems.

It should be understood that specific embodiments of the present invention are presented above merely for purposes of illustration and description and should not be interpreted to limit the scope of the claims herein. Based on the disclosure and teachings provided herein, many modifications, variations, alternatives, and equivalents will be apparent to and recognized by a person skilled in the art and are intended to be within the scope of this present invention. For example, the RF channels can be in different frequency bands. Also, the RF channels need not be contiguous. Also, the described circuits and methods can be implemented in a multitude of different forms (i.e., software, hardware such as CMOS, or a combination of both) in a variety of systems.

It is understood that the examples and embodiments described herein are for illustrative purposes only and that various modifications or changes in light thereof will be suggested to persons skilled in the art and are to be included within the spirit and purview of this application and scope of the appended claims. All publications, patents, and patent applications cited herein are hereby incorporated by reference for all purposes in their entirety.

What is claimed is:

1. A system for managing bandwidth in a content distribution system, comprising:
    a plurality of content programs, each content program having a plurality of portions; and
    a content head end configured to receive the plurality of content programs and transmit the plurality of content programs across a plurality of RF channels, the content head end including:
        a program multiplexer configured to receive and multiplex respective portions of the content programs into an output queue; and
        a multi-channel modulating module including a single channel sampler configured to sample and distribute the portions of the content programs from the output queue to a plurality of modulators,
    wherein portions of a content program are transmitted using a plurality of RF channels; and
    wherein two or more of the plurality of RF channels are non-contiguous.

2. The system of claim 1 wherein bandwidth utilization of an RF channel is maximized using respective portions from one or more content programs.

3. The system of claim 1 wherein the portions of the content program are respectively transmitted using the one or more of the plurality of RF channels at the same time or at different times.

4. The system of claim 1 wherein the content head end is capable of transmitting a first content program using a dedicated RF channel; and
 wherein the content head end is capable of transmitting a second content program using one or more of the plurality of RF channels.

5. The system of claim 4 wherein the dedicated RF channel is to be received by legacy equipment.

6. The system of claim 1 wherein the content head end further comprises:
 a program multiplexer configured to receive the plurality of content programs and multiplex the respective portions of the plurality of content programs into an output queue;
 a multi-channel modulating module configured to receive and assign portions from the output queue to a plurality of modulators corresponding to the plurality of RF channels, each modulator configured to use its assigned portions to modulate an RF signal over a corresponding RF channel;
 a channel multiplexer configured to receive respective modulated RF signals associated with the plurality of RF channels and multiplex the modulated RF signals into a multi-channel RF signal;
 a digital-to-analog converter configured to convert the multi-channel RF signal into an analog multi-channel RF signal; and
 a frequency block-up converter configured to shift the analog multi-channel RF signal into proper frequency range for transmission.

7. The system of claim 6 wherein the multi-channel modulating module assigns portions from the output queue to a modulator based on available bandwidth of the RF channel associated with that modulator.

8. The system of claim 6 wherein the multi-channel modulating module assigns portions from the output queue to a modulator based on type of equipment that is intended to receive the RF channel associated with that modulator.

9. The system of claim 1 wherein the content head end further comprises:
 a program multiplexer configured to receive the plurality of content programs and multiplex the respective portions of the plurality of content programs;
 a plurality of single channel modulators, each single channel modulator configured to receive respective portions of one or more content programs from the program multiplexer and generate a single channel RF signal using the respective portions of one or more content programs;
 a plurality of digital-to-analog converters, each of the plurality digital-to-analog converters being coupled to a corresponding single channel modulator and configured to convert the single channel RF signal into an analog, single channel RF signal;
 a plurality of frequency block-up converters, each of the plurality of frequency block-up converters being coupled to a corresponding digital-to-analog converter and configured to shift the analog, single channel RF signal into a proper frequency range; and
 an RF channel multiplexer configured to receive and multiplex respective shifted analog, single channel RF signals from the plurality of frequency block-up converters into a multi-channel RF signal.

10. A content head end for use with a content distribution system, comprising:
 a program multiplexer configured to receive a plurality of content programs, each content program being comprised of a plurality of packets, and multiplex the respective packets of the plurality of content programs into a plurality of output queues; and
 a multi-channel modulating module including a single channel sampler configured to receive packets from the one or more output queues and distribute the packets to a plurality of modulators corresponding to a plurality of RF channels, each modulator configured to use its assigned packets to modulate a plurality of RF signals respectively associated with a plurality of RF channels;
 wherein packets from a content program are transmitted in a plurality of RF channels; and
 wherein some or all of the plurality of RF channels are non-contiguous.

11. The content head end of claim 10 further comprising:
 a digital-to-analog converter configured to convert the plurality of modulated RF signals into an analog multi-channel RF signal; and
 a frequency block-up converter configured to shift the analog multi-channel RF signal into proper frequency range for transmission.

12. The content head end of claim 11 wherein the digital-to-analog converter is further configured to convert an entire signal band including a plurality of RF channels.

13. The content head end of claim 10 wherein bandwidth utilization of an RF channel is maximized using respective packets from one or more content programs.

14. The content head end of claim 10 wherein the packets from the content program are respectively transmitted using one or more of the plurality of RF channels at the same time or at different times.

15. The content head end of claim 10 wherein which packets from the one or more output queues are used to modulate an RF signal associated with an RF channel depend on available bandwidth of the RF channel.

16. The content head end of claim 10 wherein which packets from the one or more output queues are used to modulate an RF signal associated with an RF channel depend on type of equipment that is intended to receive the RF channel.

17. The content head end of claim 16 wherein the type of equipment includes legacy equipment.

18. The content head end of claim 10 wherein packets from another content program are transmitted using a dedicated RF channel.

19. The content head end of claim 10 wherein the program multiplexer further comprises:
 a plurality of buffers, each buffer configured to receive and store packets belonging to a content program; and
 a data sampler configured to sample the plurality of buffers and output the respective stored packets onto the one or more output queues.

20. The content head end of claim 10 wherein the multi-channel modulating module further comprises:
 a channel sampler configured to sample the one or more output queues and output packets stored therein; and
 a plurality of modulators, each modulator configured to receive packets outputted by the channel sampler and use the received packets to modulate an RF signal associated with an RF channel.

21. The content head end of claim 10 wherein the content distribution system includes a satellite system, a terrestrial TV system, and a cable system.

22. A content head end comprising:
a program multiplexer configured to receive a plurality of content programs, each content program being comprised of a plurality of packets, and multiplex the respective packets of the plurality of content programs into an output queue;
a multi-channel modulating module including a single channel sampler configured to receive and assign packets from the output queue to a plurality of modulators corresponding to a plurality of RF channels, each modulator configured to use its assigned packets to modulate an RF signal over a corresponding RF channel, wherein the packets from at least one of the content programs are used to modulate at least two of the RF signals, thereby causing these packets to be transmitted over the at least two RF channels that are associated with the at least two RF signals;
a channel multiplexer configured to receive respective modulated RF signals associated with the plurality of RF channels and multiplex the modulated RF signals into a multi-channel RF signal;
a digital-to-analog converter configured to convert the multi-channel RF signal into an analog multi-channel RF signal; and
a frequency block-up converter configured to shift the analog multi-channel RF signal into proper frequency range for transmission;
wherein some or all of the plurality of RF channels are non-contiguous.

23. The content head end of claim 22 wherein packets from a content program are respectively transmitted using one or more of the plurality of RF channels.

24. The content head end of claim 22 wherein packets from another content program are transmitted using a dedicated RF channel.

25. The content head end of claim 22 wherein the multi-channel modulating module assigns packets from the output queue to a modulator based on available bandwidth of the RF channel associated with that modulator.

26. The content head end of claim 22 wherein the multi-channel modulating module assigns packets from the output queue to a modulator based on type of equipment that is intended to receive the RF channel associated with that modulator.

27. The content head end of claim 26 wherein the type of equipment includes legacy equipment.

28. The content head end of claim 22 wherein bandwidth utilization of an RF channel is maximized using respective packets from one or more content programs.

29. A content distribution system incorporating the content head end of claim 22.

30. The content head end of claim 29 wherein the content distribution system wherein the content distribution system includes a satellite system, a terrestrial TV system, and a cable system.

31. The content head end of claim 22 wherein the digital-to-analog converter is further configured to convert an entire signal band including a plurality of RF channels.

32. A method for managing bandwidth in a content distribution system, comprising:
multiplexing a plurality of content programs into an output queue, each content program being comprised of a plurality of packets;
sampling, via a single channel sampler, packets from the output queue;
distributing, via the single channel sampler, the packets to a plurality of modulators; and
using packets from the output queue to modulate a plurality of RF signals, each RF signal associated with an RF channel;
wherein packets from a content program are used to modulate the RF signals, thereby causing such packets to be transmitted over the RF channels; and
wherein the RF channels are non-contiguous.

33. The method of claim 32 wherein which packets are to be used to modulate an RF signal depends on available bandwidth of the RF channel associated with that RF signal.

34. The method of claim 32 wherein which packets are to be used to modulate an RF signal depends on type of equipment that is intended to receive the RF channel associated with that RF signal.

35. The method of claim 34 wherein the type of equipment includes legacy equipment.

36. The method of claim 32 wherein packets from another content program are used to modulate one specific RF signal, thereby causing such packets to be transmitted over one specific RF channel associated with that one specific RF signal.

37. The method of claim 32 further comprising:
converting the one or more modulated RF signals into an analog multi-channel RF signal; and
shifting the analog multi-channel RF signal to another frequency band.

38. The method of claim 32 wherein the content distribution system includes a satellite system, a terrestrial TV system, and a cable system.

39. A method for managing bandwidth in a content distribution system, comprising:
multiplexing respective packets of a plurality of content programs into an output queue;
sampling, via a single channel sampler, packets from the output queue;
distributing, via the single channel sampler, the packets from the output queue to a plurality of modulators;
causing each modulator to use its distributed packets to modulate an RF signal associated with an RF channel, wherein the packets from at least one of the content programs are used to modulate at least two of the RF signals, thereby causing these packets to be transmitted over the at least two RF channels that are associated with the at least two RF signals, and
wherein at least two of the RF channels corresponding to the plurality of modulators are non-contiguous;
multiplexing the modulated RF signals from the plurality of modulators to generate a multi-channel RF signal;
converting the multi-channel RF signal into an analog multi-channel RF signal; and
shifting the analog multi-channel RF signal to a higher frequency band.

40. The method of claim 39 wherein which packets are to be distributed to a modulator to modulate an RF signal depends on available bandwidth of the RF channel associated with that modulator.

41. The method of claim 39 wherein which packets are to be distributed to a modulator to modulate an RF signal depends on type of equipment that is intended to receive the RF channel associated with that RF modulator.

42. The method of claim 41 wherein the type of equipment includes legacy equipment.

43. The method of claim 39 wherein packets from another content program are distributed to a specific modulator to modulate one specific RF signal, thereby causing such packets to be transmitted over one specific RF channel associated with that specific modulator.

* * * * *